United States Patent
Park et al.

(10) Patent No.: US 9,837,829 B2
(45) Date of Patent: Dec. 5, 2017

(54) WIRELESS POWER TRANSMISSION SYSTEM HAVING WIRELESS POWER TRANSMITTER

(71) Applicant: LG INNOTEK CO., LTD., Seoul (KR)

(72) Inventors: Jay Park, Seoul (KR); Young Kil Song, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 278 days.

(21) Appl. No.: 14/670,878

(22) Filed: Mar. 27, 2015

(65) Prior Publication Data

US 2015/0280450 A1    Oct. 1, 2015

(30) Foreign Application Priority Data

Mar. 27, 2014 (KR) .................. 10-2014-0035694
Apr. 24, 2014 (KR) .................. 10-2014-0049613

(51) Int. Cl.
| | | |
|---|---|---|
| *H02J 5/00* | (2016.01) | |
| *H02J 7/02* | (2016.01) | |
| *H02J 50/12* | (2016.01) | |
| *H02J 50/40* | (2016.01) | |
| *H02J 17/00* | (2006.01) | |

(52) U.S. Cl.
CPC .............. *H02J 5/005* (2013.01); *H02J 7/025* (2013.01); *H02J 17/00* (2013.01); *H02J 50/12* (2016.02); *H02J 50/40* (2016.02)

(58) Field of Classification Search
CPC . H01F 38/14; H02J 5/005; H02J 7/025; H02J 17/00; H02J 50/10; H02J 50/12; H02J 50/40; H04B 5/0037; H04B 5/0075; H04B 5/0081; H04B 5/0087

USPC ........................................................ 307/104
See application file for complete search history.

(56) References Cited

U.S. PATENT DOCUMENTS 8,466,375 B2    6/2013    Cho et al.
2011/0127845 A1*    6/2011    Walley ................... H02J 5/005
                                                              307/104

(Continued)

FOREIGN PATENT DOCUMENTS

KR    10-2007-0078889 A    8/2007
KR    10-2012-0019219         3/2012

(Continued)

OTHER PUBLICATIONS

International Search Report dated Jun. 29, 2015 issued in Application No. PCT/KR2015/002961.

*Primary Examiner* — Levi Gannon
(74) *Attorney, Agent, or Firm* — KED & Associates, LLP

(57) ABSTRACT

The wireless power transmitter includes a substrate; a first blocking unit disposed over the substrate and formed of a metallic material; a second blocking unit over the first blocking unit; and a wireless transmission unit mounted on at least one of the first blocking unit and the second blocking unit, wherein the wireless transmission unit includes: a first wireless transmission unit including a first transmission coil; a second wireless transmission unit including a second transmission coil; and a control unit to control such that AC power is output to a transmission coil of one of the wireless transmission units according to a power transmission scheme.

19 Claims, 15 Drawing Sheets

(56) References Cited

U.S. PATENT DOCUMENTS

| | | | |
|---|---|---|---|
| 2012/0049991 A1* | 3/2012 | Baarman | H01F 17/0013 336/199 |
| 2013/0049484 A1 | 2/2013 | Weissentern et al. | |
| 2014/0152245 A1* | 6/2014 | Choi | H02J 7/0042 320/108 |
| 2014/0265612 A1* | 9/2014 | Choi | H01F 27/365 307/104 |
| 2014/0368052 A1 | 12/2014 | Norconk et al. | |
| 2015/0061581 A1* | 3/2015 | Ben-Shalom | H01F 38/14 320/108 |
| 2016/0231364 A1* | 8/2016 | Nejatali | G01R 19/0092 |
| 2017/0005399 A1* | 1/2017 | Ito | H01Q 7/06 |

FOREIGN PATENT DOCUMENTS

| | | |
|---|---|---|
| KR | 10-2012-0069349 A | 6/2012 |
| KR | 10-2012-0082767 A | 7/2012 |
| KR | 10-2013-0098730 | 9/2013 |
| KR | 10-2013-0134726 A | 12/2013 |
| KR | 10-2014-0031709 | 3/2014 |
| WO | WO 2013/103756 | 7/2013 |

\* cited by examiner (a)

(b)

(a)

(b)

(a)

(b)

WIRELESS POWER TRANSMISSION SYSTEM HAVING WIRELESS POWER TRANSMITTER

CROSS-REFERENCE TO RELATED APPLICATIONS

This application claims priority under 35 U.S.C. §119 to Korean Application Nos. 10-2014-0035694 filed on Mar. 27, 2014 and 10-2014-0049613 filed on Apr. 24, 2014, whose entire disclosures are hereby incorporated by reference.

BACKGROUND

1. Field

The embodiment relates to a wireless power transmission system having a wireless power transmitter.

2. Background

Various kinds of electronic appliances employ batteries and are driven by using the power charged in the batteries, where the battery of an electron appliance may be exchanged or may be recharged. The electronic appliance may include a contact terminal for making contact with an external charging apparatus in order to charge the battery. The electronic appliance is electrically connected to the charging apparatus through the contact terminal. However, the contact terminal may be exposed to an outside of the electronic appliance, such that the contact terminal may be contaminated or shot-circuited due to moisture. In this case, a contact error may be generated between the contact terminal and the charging apparatus to prevent charging of the battery.

An alternative to a contact terminal, a wireless power transmission system, is a technique of transferring power through space without any wires, and maximizes the convenience of supplying power to mobile appliances and digital home appliances. The wireless power transmission system may save energy through real-time power using control, overcome a spatial restriction on power supply and reduce consuming power by using the recharging of a battery. A scheme of implementing a wireless power transmission system is typically classified into a magnetic induction scheme and a magnetic resonance scheme.

The magnetic induction scheme, which is a contactless energy transmission technique which generates electromotive force at one coil through the medium of a magnetic flux generated by allowing two coils to approach closely to each other and current to flow through the other coil, may utilize a frequency of several hundreds of kHz. The magnetic resonance scheme, which is a magnetic resonance technique which uses an electric or magnetic field without using any electromagnetic waves or electric currents, may have a transmissible distance of several meters or more and use a bandwidth of several tens of MHz.

In power transmission efficiency between a transmitter of transmitting power and a receiver of receiving power, impedance matching and selection of a target receiver in a wireless power transmission system, it is important to generate a voltage required of the wireless power transmission system by varying the voltage of a power supply. However, since the system additionally includes a circuit for sensing the voltages or currents of coils included in a transmitter and a receiver and a circuit for controlling the voltage through communication between the transmitter and the receiver, the volume and the complexity of the system are increased.

In addition, in a wireless power transmitter including the magnetic induction scheme and the magnetic resonance scheme, since the electromagnetic induction scheme and the magnetic resonance scheme are different from each other in the ranges of output voltages and the output types, the wireless power transmitter must employ a transformer driven in the electromagnetic induction scheme and a transformer driven in the magnetic resonance scheme, that is, two independent transformers, so that the cost and the complexity of a circuit design are increased. As the circuit complexity of the wireless power transmission system is increased, the heat and electromagnetic waves generated from the components of the wireless power transmitter may deteriorate the performance of the components. In addition, the heat and electromagnetic waves generated from the components may deteriorate the wireless power receiver.

BRIEF DESCRIPTION OF THE DRAWINGS

The embodiments will be described in detail with reference to the following drawings in which like reference numerals refer to like elements wherein.

DETAILED DESCRIPTION

Figure 1:
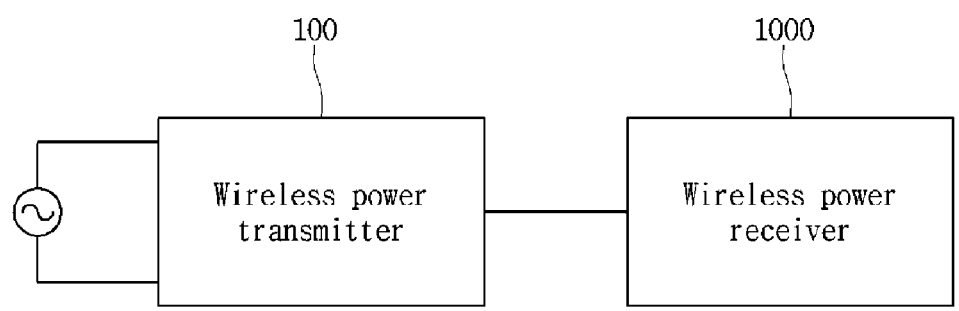
FIG. 1 is a block diagram showing a wireless power transmission system to which an embodiment is applied.

FIG. 1 is a block diagram showing a wireless power transmission system to which an embodiment is applied. A wireless power transmission system 1 according to an embodiment includes a wireless power transmitter 100 and a wireless power receiver 1000.

The wireless power transmitter 100 is connected to a power source to receive power from the power source. The wireless power transmitter 100 wirelessly transmits power. In this case, the wireless power transmitter 100 may transmit AC power. The wireless power transmitter 100 may transmit power in various charging schemes. The transmission schemes may include an electromagnetic induction scheme, a resonance scheme and an RF/micro wave radiation scheme. At least one charging scheme is preset to the wireless power transmitter 100. The wireless power transmitter 100 may transmit power in the preset charging scheme.

The wireless power receiver 1000 wirelessly receives power. The wireless power receiver 1000 may receive AC power. The wireless power receiver 1000 may convert AC power into DC power. The wireless power receiver 1000 may receive power according to various charging schemes. The reception schemes may include an electromagnetic induction scheme, a resonance scheme and an RF/micro wave scheme. At least one charging scheme is preset to the wireless power receiver 100. The wireless power receiver 1000 may receive power in the preset charging scheme. The wireless power receiver 1000 may be driven by using received power.

Figure 2:
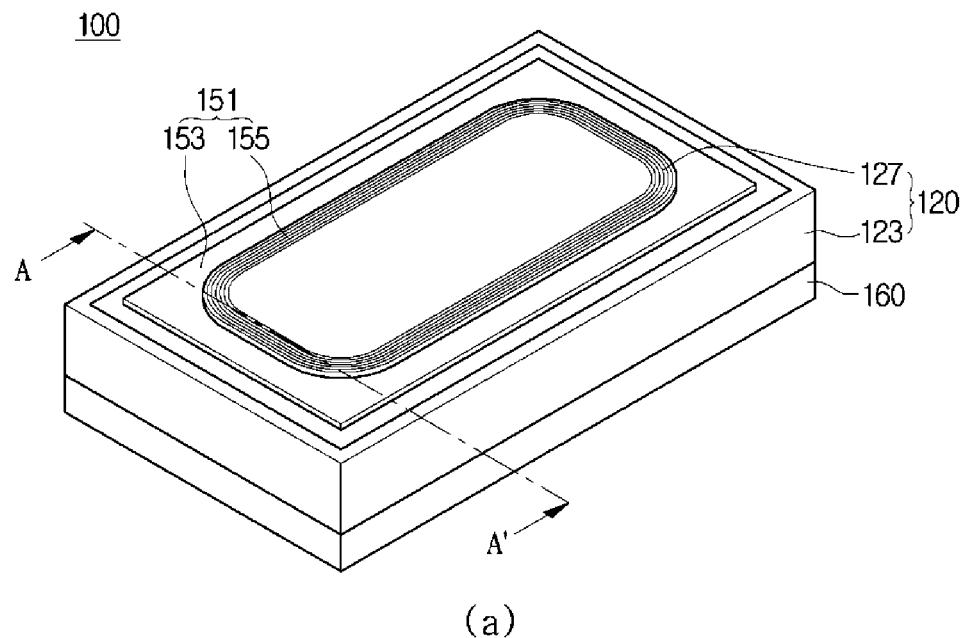
FIG. 2 is a perspective view showing a wireless power transmitter according to an embodiment.
Figure 2:
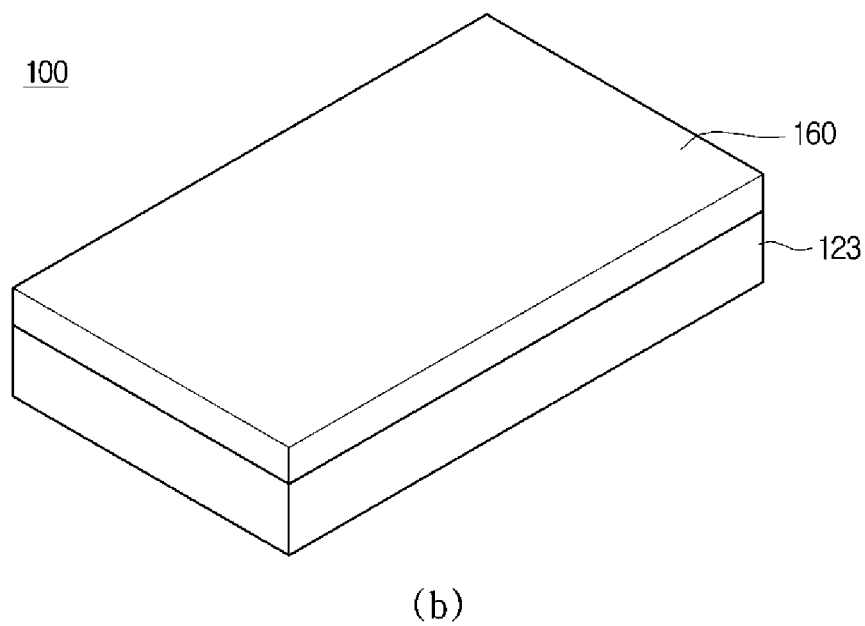
Figure 3:
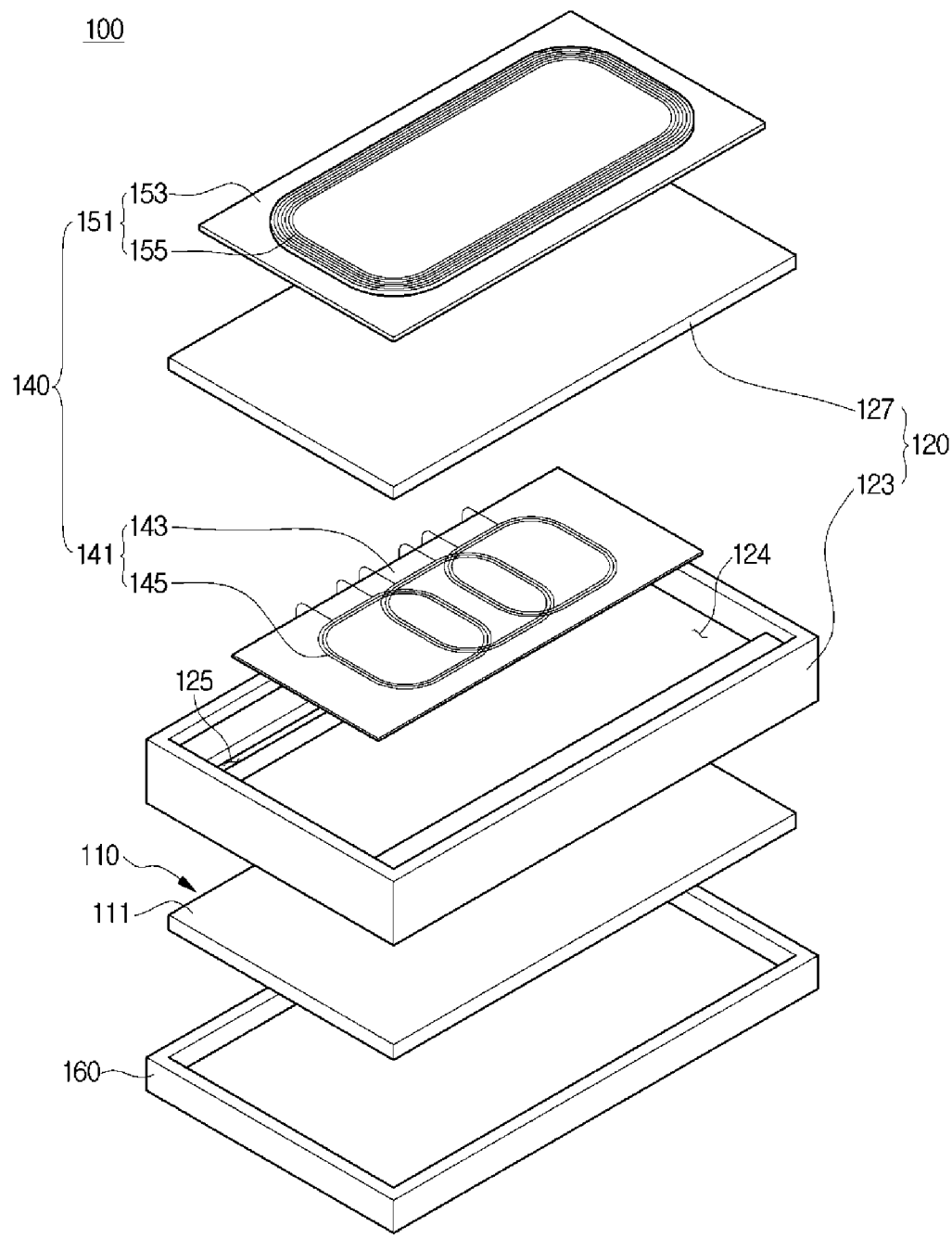
FIG. 3 is an exploded perspective view of a wireless power transmitter according to an embodiment.
Figure 4:
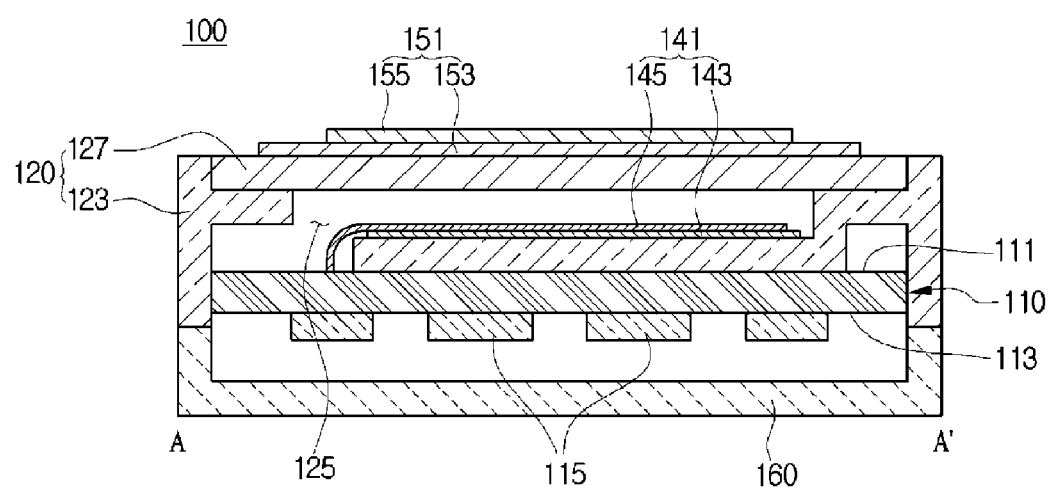
FIG. 4 is a sectional view taken along line A-A' of FIG. 2.

FIG. 2 is a perspective view showing a wireless power transmitter according to an embodiment, where (a) of FIG. 2 is a plan perspective view of the wireless power transmitter, and (b) of FIG. 2 is a rear perspective view of the wireless power transmitter. FIG. 3 is a perspective view showing an exploded wireless power transmitter according to the first embodiment. FIG. 4 is a sectional view taken along line A-A' of FIG. 2. The wireless power transmitter 100 of an embodiment includes a substrate 110, a blocking unit 120, a wireless transmission unit 140 and a housing 160.

The substrate 110 supports the blocking unit 120 and the wireless transmission unit 140. The substrate 110 may be implemented in a flat plate structure, where a top surface 111 faces the wireless power receiver and a bottom surface 113 opposite to the top surface 111. The substrate 110 controls the overall operation of the wireless power transmitter 100. The substrate 110 may be formed of a dielectric material in which a plurality of transmission lines (not shown) is embedded. The substrate 110 may be implemented by laminating a plurality of dielectric layers. For example, the substrate 110 may be a printed circuit board (PCB).

The substrate 110 includes a plurality of components 115. The components 115 may be mounted on the bottom surface 113 of the substrate 110. The components 115 may be in contact with a transmission line, so that the transmission line may transfer signals output from or input to the components 115. For example, the components 115 may include a control device, a memory device and a power supply device.

The blocking unit 120 isolates the components 115 and the wireless transmission unit 140 from each other in the wireless power transmitter 100. The blocking unit 120 is interposed between the components 115 and the wireless transmission unit 140. In this case, the blocking unit 120 is disposed over the substrate 110. The blocking unit 120 includes first and second blocking units 123 and 127.

The first blocking unit 123 is disposed over the substrate 110. In this case, the first blocking unit 123 faces the top surface 111 of the substrate 110. The first blocking unit 123 covers the top surface 111 of the substrate 110. The first blocking unit 123 may be disposed closely to the top surface 111 of the substrate 110 and may make contact with the top surface 111 of the substrate 110.

The first blocking unit 123 may also support the second blocking unit 127. The first blocking unit 123 may support the second blocking unit 127 in an edge region. The first blocking unit 123 is coupled to the second blocking unit 127 in the edge region. A reception portion 124 is formed in a central area of the first blocking unit 123. The reception part 124 may be concaved corresponding to the top surface 111 of the first blocking unit 123. An opening part 125 is formed in the first blocking unit 123. The opening part 125 passes through the first blocking unit 123. In this case, the opening part 125 may expose a part of the substrate 110.

The first blocking unit 123 may be formed of a metallic material. For example, the metallic material may include aluminum (Al) and magnesium (Mg). The first blocking unit 123 includes a top surface which faces the wireless power receiver and a bottom surface which is opposite to the top surface while facing the substrate 110.

The second blocking unit 127 is provided on the first blocking unit 123. The second blocking unit 127 may be coupled to the first blocking unit 123 in the edge region. The second blocking unit 127 is spaced apart from the first blocking unit 123 in the central region. The second blocking unit 127 may have a flat plate shape.

The second blocking unit 127 is formed of a metallic material. In this case, the metallic material of the second blocking unit 127 may be equal to or different from that of the first blocking unit 123. For example, the metallic material includes aluminum (Al) and magnesium (Mg). The second blocking unit 127 includes a top surface which faces the wireless power receiver and a bottom surface which is opposite to the top surface while facing the first blocking unit 123.

The wireless transmission unit 140 of the wireless power transmitter 100 wirelessly transmits power. In this case, the wireless transmission unit 140 transmits power in various charging schemes. In this case, the charging schemes include an electromagnetic induction scheme, a resonance scheme and an RF/micro wave radiation scheme. The detailed configuration and operation of the wireless transmission unit 140 will be described with reference to FIGS. 11 to 18.

The wireless transmission unit 140 may be mounted on the blocking unit 120. The wireless transmission unit 140 may be mounted on at least one of the first and second blocking units 123 and 127. The wireless transmission unit 140 is opposite to the substrate 110 while interposing the blocking unit 120 therebetween. The wireless transmission unit 140 includes a first wireless transmission unit 141 and a second wireless transmission unit 151. The first and second wireless transmission units 141 and 151 may transmit power in mutually different charging schemes.

The first wireless transmission unit 141 transmits power in a first charging scheme. For example, the first charging scheme may be an electromagnetic induction scheme, but the embodiment is not limited thereto. The first wireless transmission unit 141 is mounted on the first blocking unit 123. The first wireless transmission unit 141 is mounted on the first blocking unit 123. The first wireless transmission unit 141 is disposed in the reception portion 124 of the first blocking unit 123. In addition, the wireless transmission unit 141 is mounted on the top surface of the first blocking unit 123. The first wireless transmission unit 141 includes a first shield member 143 and at least one first transmission coil 145.

The first shield member 143 isolates the first blocking unit 123 and the first transmission coil 145 from each other in the wireless transmission unit 140. In this case, the first shield member 143 adheres to the top surface of the first blocking unit 123. The first shield member 143 is formed of ferrite. In this case, the first shield member 143 may include metal powders and a resin material. For example, the metal powders, which are soft-magnetic metal powders, may include aluminum (Al), metal silicon and iron oxide (FeO, Fe3O4, Fe2O3). In addition, the resin material, which is thermoplastic resin, may include polyolefin elastomer. The first shield member 143 includes a top surface which faces the wireless power receiver and a bottom surface which is opposite to the top surface while making contact with the first blocking unit 123.

The first transmission coil 145 substantially transmits power in the wireless transmission unit 140. In this case, the first transmission coil 145 is connected to the substrate 110 through both ends thereof. In this case, the first transmission coil 145 is connected to the substrate 110 through the opening part 125 of the first blocking unit 123. The first transmission coil 145 transmits the power received from the substrate 110. In this case, when the first transmission coil 145 is operated, electromagnetic field is formed at a circumstantial area of the first transmission coil 145. The first transmission coil 145 adheres to the first shield member 143. The first transmission coil 145 adheres to the top surface of the first shield member 143. The first transmission coil 145 is opposite to the first blocking unit 123 while interposing the first shield member 143 therebetween.

The second wireless transmission unit 151 transmits power in the second charging scheme. For example, the second charging scheme may be a resonance scheme, but the embodiment is not limited thereto. In addition, the second wireless transmission unit 151 is mounted on the second blocking unit 127. In this case, the second wireless transmission unit 151 is mounted on the top surface of the second blocking unit 127. The wireless transmission unit 151 includes the second shield member 153 and at least one second transmission coil 155.

The second shield member 153 isolates the second blocking unit 127 and the second transmission coil 155 from each other in the wireless transmission unit 140. In this case, the second shield member 153 adheres to the top surface of the second blocking unit 127. The second shield member 153 may be formed of ferrite. In this case, the second shield member 153 may include metal powders and a resin material. For example, the metal powders, which are soft-magnetic metal powders, may include aluminum (Al), metal silicon and iron oxide (FeO, Fe3O4, Fe2O3). In addition, the resin material, which is thermoplastic resin, may include polyolefin elastomer. The second shield member 153 includes a top surface which faces the wireless power receiver and a bottom surface which is opposite to the top surface while making contact with the second blocking unit 127.

The second transmission coil 155 substantially transmits power in the wireless transmission unit 140. In this case, the second transmission coil 155 is connected to the substrate 110 through both ends thereof. The second transmission coil 155 transmits the power received from the substrate 110. In this case, when the second transmission coil 155 is operated, electromagnetic field is formed at a circumstantial area of the second transmission coil 155. The second transmission coil 155 adheres to the second shield member 153. In this case, the second transmission coil 155 adheres to the top surface of the second shield member 153. That is, the second transmission coil 155 is opposite to the second blocking unit 153 while interposing the second shield member 153 therebetween.

The housing 160 supports the substrate 110, the blocking unit 120 and the wireless transmission unit 140 of the wireless power transmitter 100. The housing 160 may receive at least one of the substrate 110, the blocking unit 120 and the wireless transmission unit 140. The housing 160 may be coupled to the blocking unit 120. In this case, the housing 160 may be coupled into the edge region of the first blocking unit 123. The housing 160 exposes at least a part of the blocking unit 120. In addition, the housing 160 is formed of a plastic material.

According to the embodiment, the blocking unit 120 is interposed between the components 115 and the wireless transmission unit 140 to isolate the components and the wireless transmission unit from each other. When the components 115 are operated, heat and an electromagnetic wave are generated from the components 115. Likewise, when the wireless transmission unit 140 is operated, heat and an electromagnetic wave are generated from the wireless transmission unit 140. However, the blocking unit 120 blocks the heat and the electromagnetic wave of the wireless transmission unit 140 corresponding to the components 115. In addition, the blocking unit 120 blocks the heat and the electromagnetic wave of the components 115 corresponding to the wireless transmission unit 140.

Figure 5:
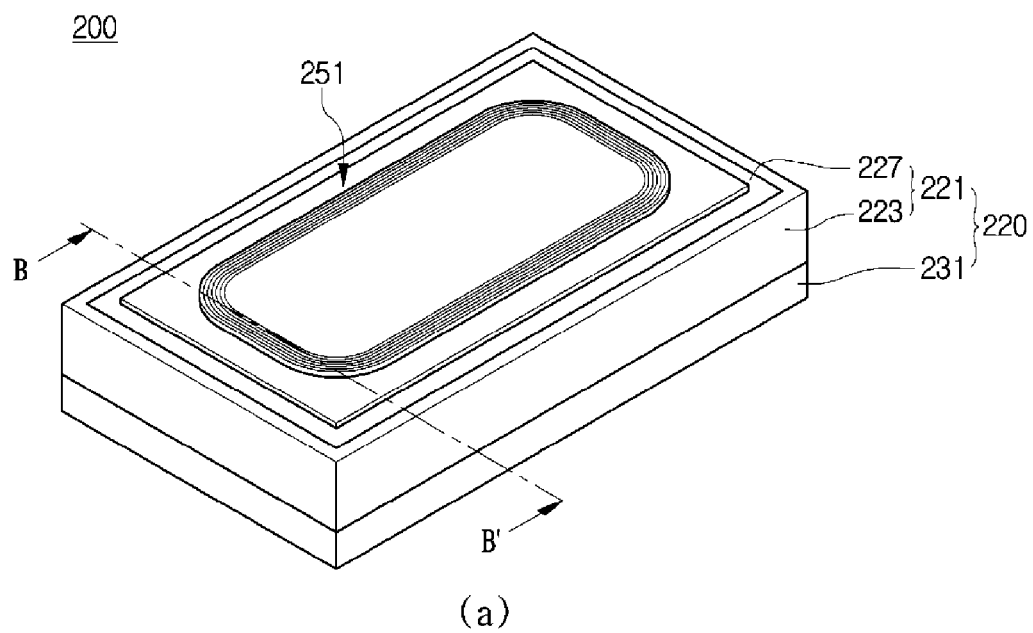
FIG. 5 is a perspective view showing a wireless power transmitter according another embodiment.
Figure 5:
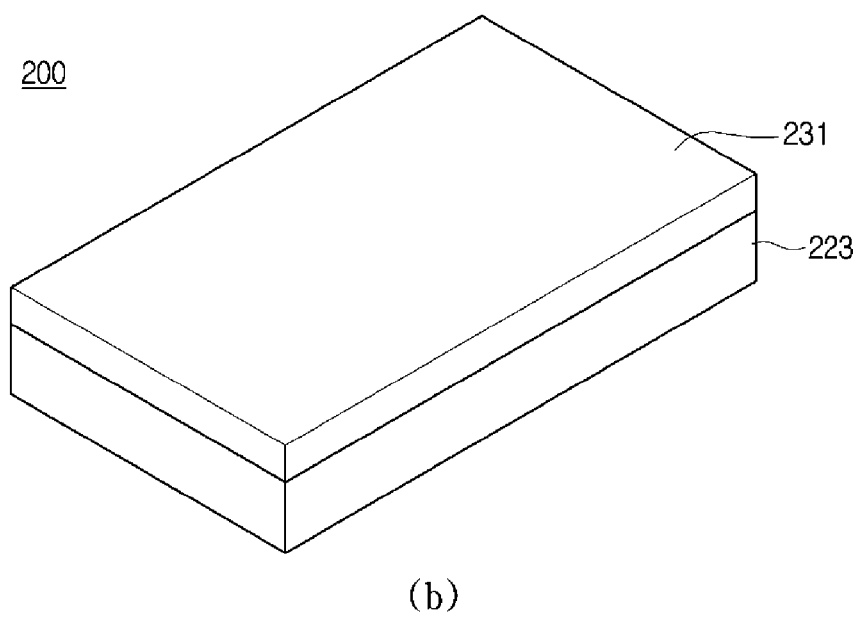
Figure 6:
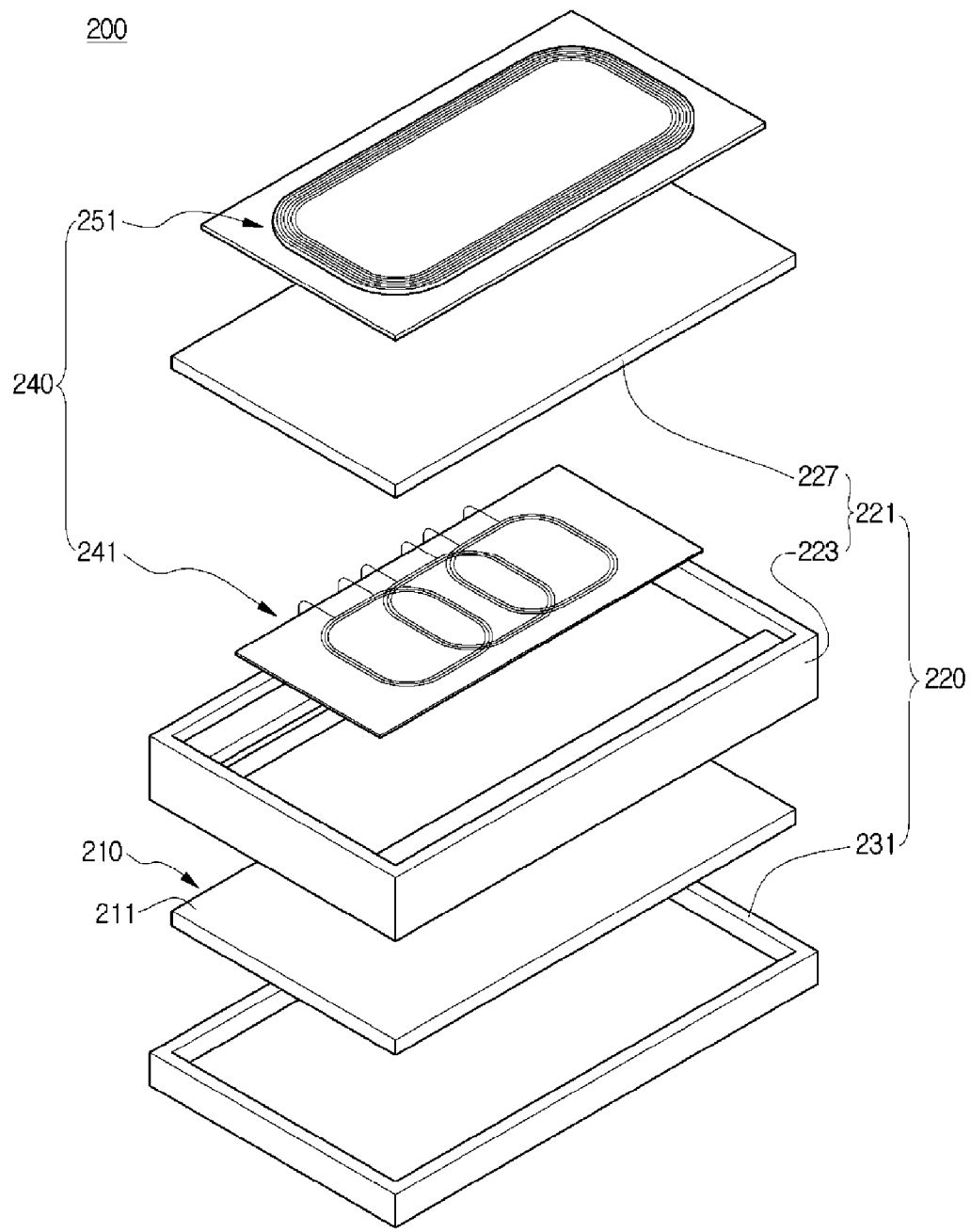
FIG. 6 is an exploded perspective view of a wireless power transmitter according to another embodiment.
Figure 7:
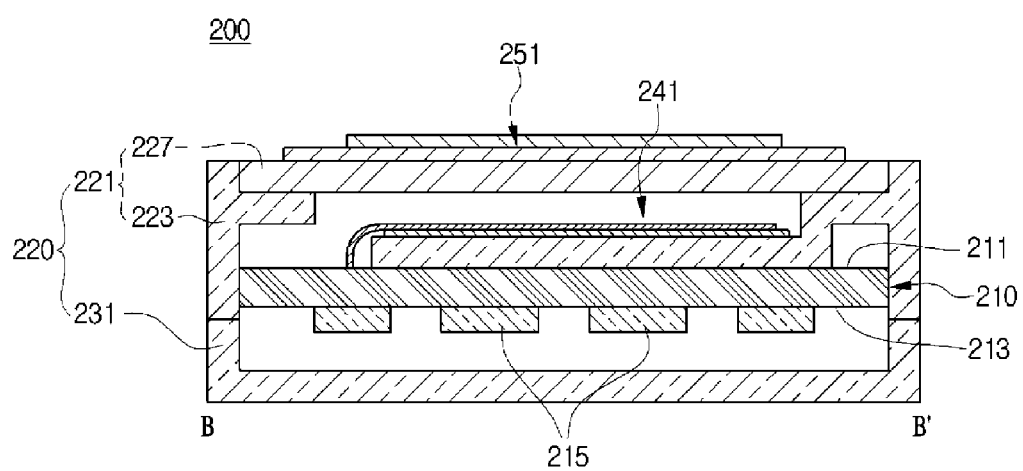
FIG. 7 is a sectional view taken along line B-B' of FIG. 5.

FIG. 5 is a perspective view showing a wireless power transmitter according another embodiment, where (a) of FIG. 5 is a plan perspective view of the wireless power transmitter, and (b) of FIG. 5 is a rear perspective view of the wireless power transmitter. FIG. 6 is an exploded perspective view of a wireless power transmitter according to another embodiment. FIG. 7 is a sectional view taken along line B-B' of FIG. 5.

The wireless power transmitter 200 includes a substrate 210, a blocking unit 220 and a wireless transmission unit 240. In the following description, since the substrate 210 and the wireless transmission unit 240 of the embodiment are similar to those of the above-described embodiment, the details will be omitted. However, according to the embodiment, the blocking unit 220 is disposed on upper and lower portions of the substrate 210. The blocking unit 220 includes an upper blocking unit 221 and a lower blocking unit 231.

The upper blocking unit 221 is disposed on the upper portion of the substrate 210. The upper blocking unit 221 includes first and second blocking units 223 and 227. In the following description, since the first and second blocking units 223 and 227 are similar to those of the above-described embodiment, the details will be omitted.

The lower blocking unit 231 is disposed on the lower portion of the substrate 210. The lower blocking unit 231 may be coupled to the first blocking unit 223 in an edge region. The lower blocking unit 231 covers a bottom surface 213 of the substrate 210. In this case, the lower blocking unit 231 is spaced apart from the first blocking unit 223 in a central region. In addition, the lower blocking unit 231 seals components 215 on the bottom surface 213 of the substrate 210.

The lower blocking unit 231 is formed of a metallic material. In this case, the metallic material of the lower blocking unit 231 may be equal to or different from that of the first blocking unit 223. The metallic material of the lower blocking unit 231 may be equal to or different from that of the second blocking unit 227. For example, the metallic material includes aluminum (Al) and magnesium (Mg). The lower blocking unit 231 includes a top surface which faces the substrate 210 and a bottom surface which is opposite to the top surface.

According to the embodiment, the blocking unit 220 is interposed between the components 215 and the wireless transmission unit 240 to isolate the components 215 and the wireless transmission unit 240 from each other. When the components 215 are operated, heat and an electromagnetic wave are generated from the components 215. Likewise, when the wireless transmission unit 240 is operated, heat and an electromagnetic wave are generated from the wireless transmission unit 240. However, the blocking unit 220 blocks the heat and the electromagnetic wave of the wireless transmission unit 240 corresponding to the components 215. In addition, the blocking unit 220 blocks the heat and the electromagnetic wave of the components 215 corresponding to the wireless transmission unit 240.

In addition, the blocking unit 220 seals the components 215 on the upper and lower portions of the substrate 210. Thus, the blocking unit 220 more effectively isolates the components 215 and the wireless transmission unit 240 from each other. Further, the blocking unit 220 protects the components 215 from an external physical impact. Thus, a thickness of the wireless power transmitter 100 is reduced so that a size of the wireless power transmitter 100 may be reduced.

Figure 8:
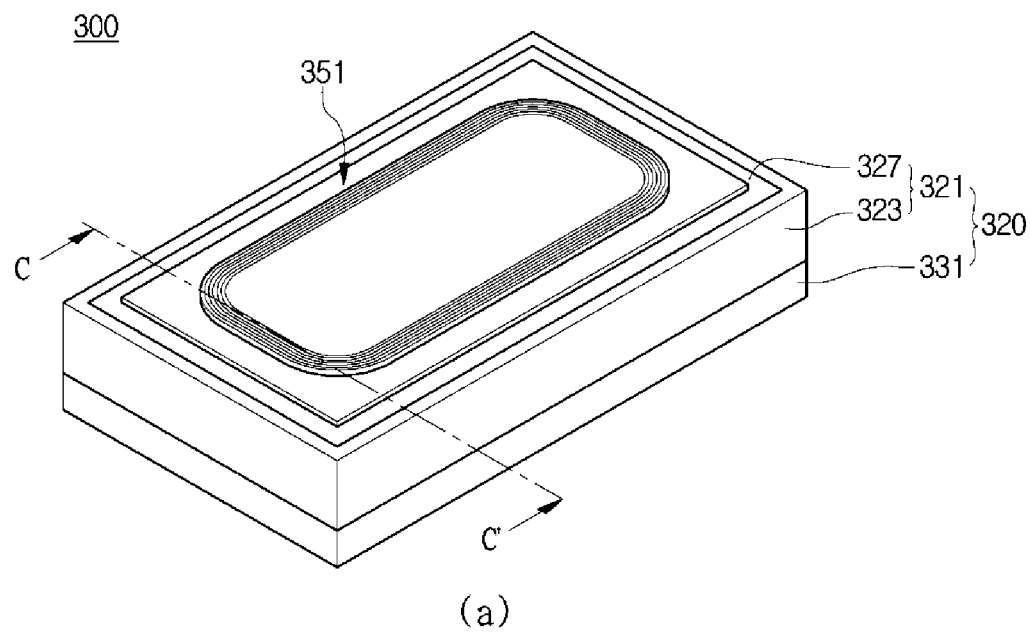
FIG. 8 is a perspective view showing a wireless power transmitter according still another embodiment.
Figure 8:
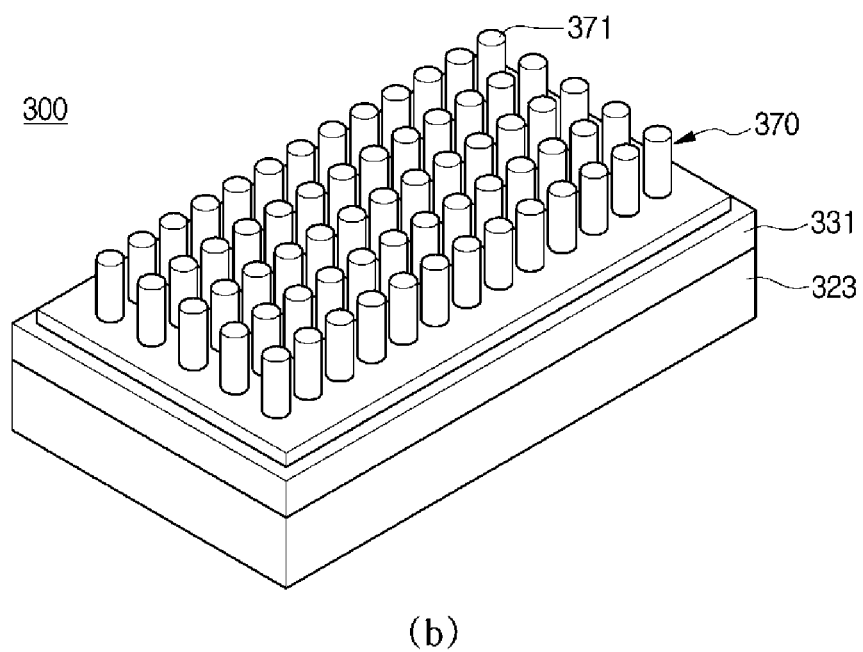
Figure 9:
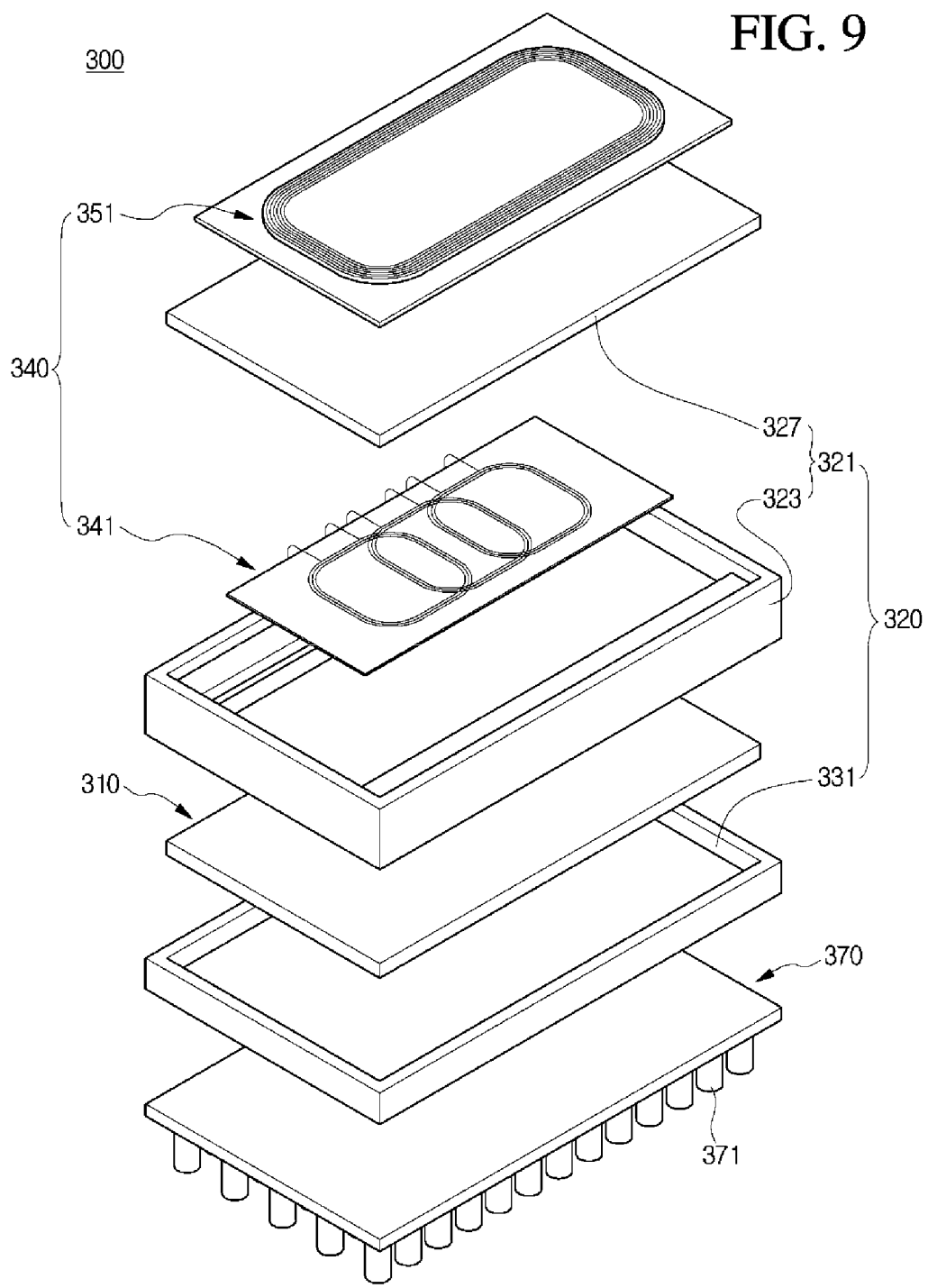
FIG. 9 is an exploded perspective view of a wireless power transmitter according to still another embodiment.
Figure 10:
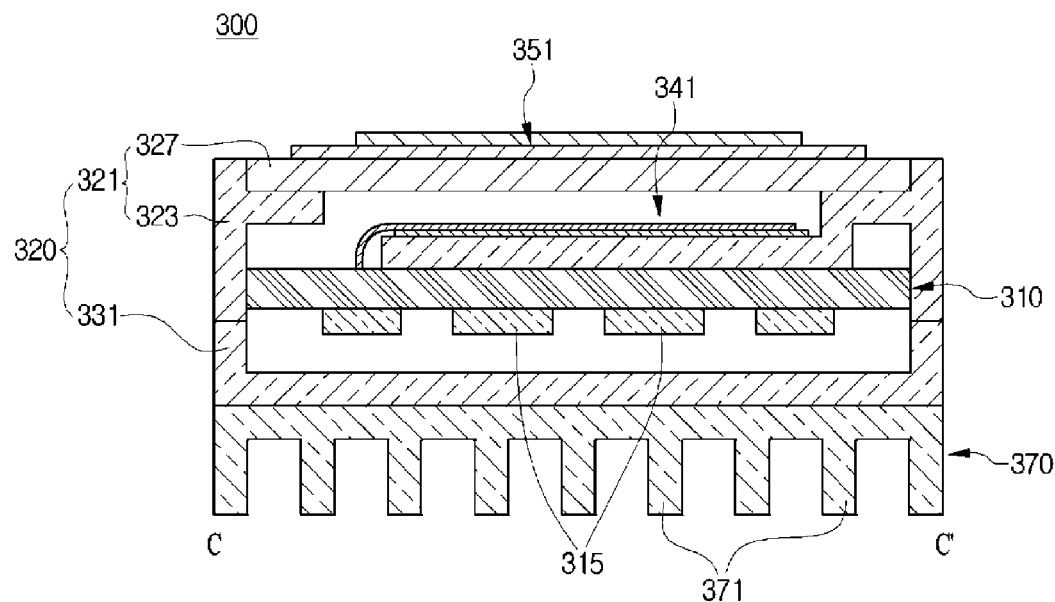
FIG. 10 is a sectional view taken along line C-C' of FIG. 8.

FIG. 8 is a perspective view showing a wireless power transmitter according still another embodiment, where (a) of FIG. 8 is a plan perspective view of the wireless power transmitter, and (b) of FIG. 8 is a rear perspective view of the wireless power transmitter. FIG. 9 is an exploded perspective view of a wireless power transmitter according to still another embodiment. FIG. 10 is a sectional view taken along line C-C' of FIG. 8.

The wireless power transmitter 300 of an embodiment includes a substrate 310, a blocking unit 320, a wireless transmission unit 340 and a heat radiation unit 370. In the following description, since the substrate 310, the blocking unit 320 and the wireless transmission unit 340 of the embodiment are similar to those of the above-described embodiment, the details will be omitted.

However, the heat radiation unit 370 radiates the heat generated from the wireless power transmitter 300. To this end, the heat radiation unit 370 is mounted on the lower blocking unit 331. The heat radiation unit 370 is mounted on the bottom surface of the lower blocking unit 331. The heat radiation unit 370 includes a plurality of heat radiation pins 371. In this case, since the heat radiation unit 370 includes the heat radiation pins 371, the heat radiation unit 370 has an enlarged surface area. The heat radiation pins 371 extend from the lower blocking unit 331.

According to the embodiment, the blocking unit 320 is interposed between the components 315 and the wireless transmission unit 340 to isolate the components 315 and the wireless transmission unit 340 from each other. When the components 215 are operated, heat and an electromagnetic wave are generated from the components 315. Likewise, when the wireless transmission unit 340 is operated, heat and an electromagnetic wave are generated from the wireless transmission unit 340. However, the blocking unit 320 blocks the heat and the electromagnetic wave of the wireless transmission unit 340 corresponding to the components 315. In addition, the blocking unit 320 blocks the heat and the electromagnetic wave of the components 315 corresponding to the wireless transmission unit 340. The blocking unit 320 also seals the components 315 on the upper and lower portions of the substrate 310. Further, the heat radiation unit 370 radiates heat. Thus, the blocking unit 320 more effectively isolates the components 315 and the wireless transmission unit 340 from each other. In addition, the blocking unit 320 protects the components 315 from an external physical impact.

Meanwhile, although the examples of the wireless transmission unit including the first wireless transmission unit 141, 241 or 341 and the second wireless transmission unit 151, 251 or 351 are described above, the embodiment is not limited thereto. That is, even when the wireless transmission unit 140, 240 or 340 includes at least one of the first wireless transmission units 141, 241 and 341 or the second wireless transmission units 151, 251 and 351, the embodiment may be implemented. In other words, the wireless transmission unit 140, 240 or 340 may include at least one of the first wireless transmission units 141, 241 and 341 or the second wireless transmission units 151, 251 and 351.

The configuration and operation of the wireless transmission unit 140, 240 or 340 will be described in detail with reference to FIGS. 11 to 18. In the following description, the reference number 140 will be assigned in common to the wireless transmission unit to which reference numerals 140, 240 and 340 are assigned according to the embodiments for the purpose of convenience and simplification of the description. The following description about the wireless transmission unit having the reference numeral 140 may be applicable to all the wireless transmission units 140, 240 and 340.

Figure 11:
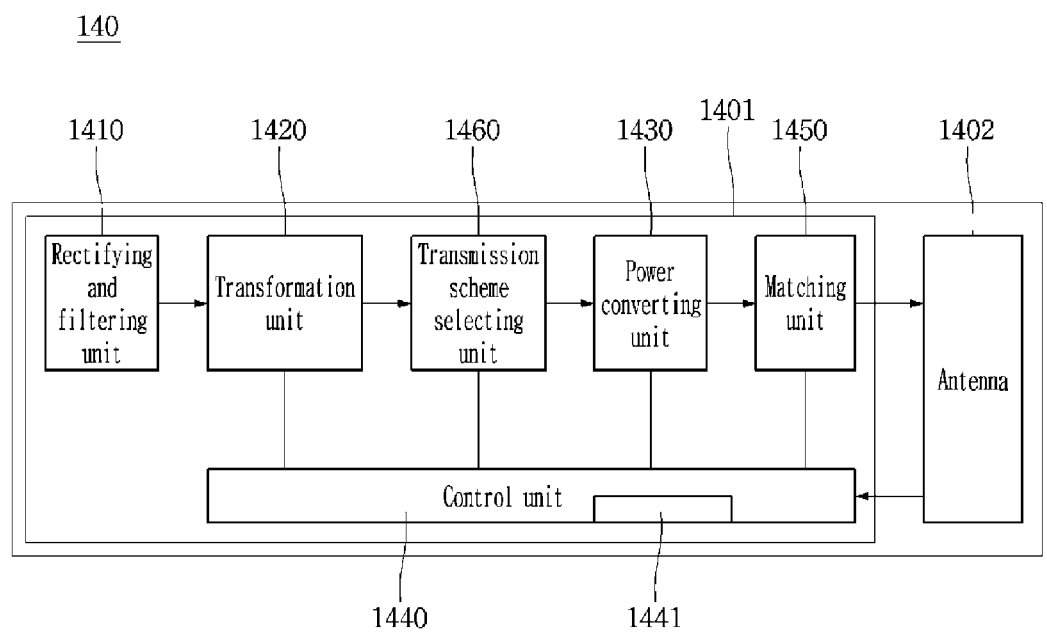
FIGS. 11 and 12 are block diagrams showing a transmitter and receiver of a wireless power transmission system according to an embodiment.
Figure 12:
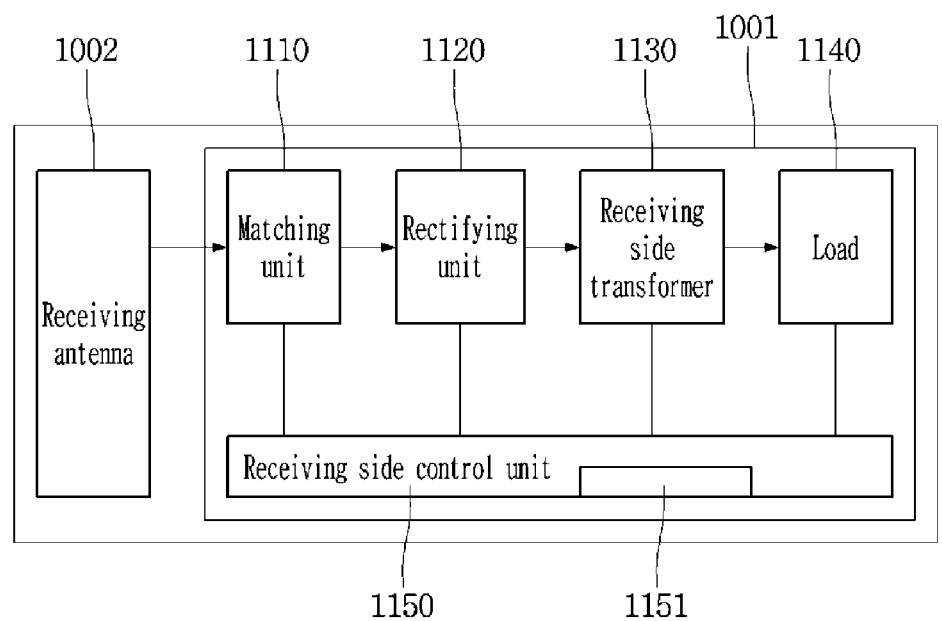

FIGS. 11 and 12 are block diagrams showing a transmitter and receiver of a wireless power transmission system according to an embodiment. The wireless transmission unit 140 of the wireless power transmitter 100 constituting the wireless power transmission system 1 according to an embodiment may include a transmission power converter 1401 and a transmission antenna 1402.

The transmission power converter 1401 may include a rectifying and filtering unit 1410, a transformation unit 1420, a power converting unit 1430, a control unit 1440 and a transmission scheme selecting unit 1460. The rectifying and filtering unit 1410 generates a DC voltage used in a next stage. The DC voltage may be supplied to the transmission antenna 1402 through the transformation unit 1420.

The transformation unit 1420 may adjust a level of the DC power output from the rectifying and filtering unit 1410 based on a control signal. The transformation unit 1420 may use a semiconductor device such as a power transistor as a switch to convert the DC input voltage into a voltage of a square wave type, such that the transformation unit 1420 may filter the converted voltage to generate a controlled DC output voltage. The control of the DC output voltage may be implemented by controlling an on/off time period of the switch.

Since the operation of the transformation unit 1420 is based on the conversion of a DC input into a DC output, the transformation unit 1420 may be called an SMPS (Switched-Mode Power Supply), a DC-DC transformer or a DC-DC converter. The transformation unit 1420 may have the characteristics of one of a buck converter of which an output voltage is lower than an input voltage thereof, a boost converter of which an output voltage is higher than an input voltage thereof, and a buck-boost converter having all characteristics of the above-mentioned converters.

A level of a DC voltage output from the transformation unit 1420 may be adjusted and controlled by a control signal of the control unit 1440. The control unit 1440 may be called a microprocessor, a micro-control unit, or a micom. The control unit 1440 may control a voltage output from the transformation unit 1420 by taking into consideration the maximum power transmission efficiency, the amount of power required by the receiver 1000 and a current charged amount of the receiver 1000. In addition, the control unit 1440 may adjust the output voltage of the transformation unit 1420 and control the overall operation of the transmission unit 140 by using an algorithm, a program or an application read out from a storage unit (not shown).

The transmission power converter 1401 may further include a transmission communication unit 1441 which is capable of communicating with a reception communication unit of the receiver 1000. The transmission communication unit 1441 of the transmission power converter 1401 may perform an out-band or in-band communication as shown in the drawing. The transmission communication unit 1441 may be separated from the control unit 1440.

The transmission and reception communication units may perform bi-directional communication. For example, the transmission and reception communication units may perform communication by using NFC (Near Field Communication), Zigbee communication, infrared communication, visible light communication, bluetooth communication or BLE (Bluetooth Low Energy) communication scheme.

In addition, the communication units may transmit or receive power information therebetween, where the power information includes at least one of a capacity of the receiver 1000, a battery residual capacity, the number of charge cycles, a used amount, a battery capacity, and a battery rate. The transmission communication unit 1441 may transmit a charging function control signal for controlling a charging function of the receiver 1000.

The charging function control signal may be a control signal for controlling the receiver 1000 such that a charging function of the receiver 1000 is enabled or disabled. Also, the power information may include information about introduction of a wire charging terminal, a switching from an SA mode into an NSA mode and an error situation release.

The power converting unit 1430 may convert an DC voltage of a level into an AC voltage by a switching pulse signal in a band of several tens of KHz to several tens of MHz to generate power. The power converting unit 1430 converts an DC voltage into an AC voltage to generate "wake-up power" or "charging power" used in a receiver 1000 entering a charging area.

The wake-up power represents low power of 0.1 mWatt to 1 mWatt. The charging power, which is power necessary to charge a battery of the receiver 1000 or consumed to operate the receiver 1000, represents large power of 1 mWatt to 200 Watt consumed in the load of a target receiver 1000.

The power converting unit 1430 may include a power amplifier for amplifying the DC voltage output from the transformation unit 1420 according to a switching pulse signal. The power converting unit 1430 may include a full-bridge or half-bridge inverter. The power converting unit 1430 may also include a plurality of power converting units. One of the power converting units may supply AC power to the induction coil in order to transmit power in a magnetic induction scheme, and another may supply AC power to the resonant coil in order to transmit power in a magnetic resonance scheme. The power converting units may generate AC signals having mutually different frequencies according to transmission schemes, respectively.

The matching unit 1450 may be disposed at a rear stage and include at least one of at least one passive element and at least one active element to match impedances with each other between the transmitter 100 and the receiver 1000, so that power transmission efficiency may be maximized. The impedance seen by the matching unit 1450 may be controlled to allow the output power to be high efficient or a high output. The matching unit 1450 may control an impedance based on the controls of the control unit 1440 and the transmission communication unit 1441. In addition, the matching unit 1450 may include at least on of a coil and a capacitor. The control unit 1440 and the transmission communication unit 1441 may control a connection state with at least one of the coil and the capacitor to perform the impedance matching.

The transmission antenna 1402 may include at least one of an induction coil and a resonant coil. When the wireless power transmission system 1 transmits power only in a magnetic induction scheme, the transmission antenna 1402 may include only the induction coil. When the wireless power transmission system 1 transmits power only in an electromagnetic resonance scheme, the transmission antenna 1402 may include only the resonant coil. When the wireless power transmission system 1 transmits power in a mixture of the electromagnetic induction scheme and the electromagnetic resonance scheme, the transmission antenna 1402 may include both of the induction and resonant coils.

In addition, there may be provided a single induction or resonant coil or a plurality of induction or resonant coils. When the plurality of induction or resonant coils are provided, the induction or resonant coils may overlap each other and the overlapping area is determined by taking into consideration a deviation between magnetic flux densities.

The transmission scheme selecting unit 1460 may be abbreviated to a selection unit. The transmission scheme selecting unit 1460 may allow the power generated from the transformation unit 1420 to be transferred to the resonant or induction coil based on a selection signal of the control unit 1440.

When the transmission scheme selecting unit 1460 selects the magnetic induction scheme as a scheme of transmitting power according to the selection signal of the control unit 1440, the transmission scheme selecting unit 1460 may connect the transformation unit 1420 to another power converting unit in the power converting unit 1430.

As shown in FIG. 12, the receiver 1000 for receiving the power output from the transmitter 140 may include a received power converter 1001 and a receiving antenna 1002. The receiving antenna 1002 may receive power in a magnetic induction scheme or a magnetic resonance scheme. The receiving antenna 1002 may include at least one induction or resonant coil. The receiving antenna 1002 may be provided together with an NFC antenna.

The received power converter 1001 may include a matching unit 1110, a rectifying unit 1120, a receiving side transformer 1130, a load 1140 and a receiving side control unit 1150. The receiving side control unit 1150 may include a receiving side communication unit 1151. The receiving side communication unit 1151 may be separated from the receiving side control unit 1150.

The matching unit 1110 performs the impedance matching between the transmission unit 140 and the receiver 1000. The rectifying unit 1120 rectifies an AC voltage output from the receiving antenna 1002 to generate a DC voltage. The receiving side transformer 1130 may include a DC-DC converter and adjust a level of the DC voltage output from the rectifying unit 1120 to a capacity of the load 1140. The load 1140 may include a battery, a display, an audio output circuit, a main processor and various kinds of sensors.

The receiving side control unit 1150 may be activated by using the wake-up power from the transmission unit 140 of the transmitter 100. The receiving side control unit 1150 may communicate with the transmitter 100 and may entirely control the receiver 1000.

There may be provided one receiver 1000 or a plurality of receivers 1000 which wirelessly receive(s) energy from the transmitter 100 at the same time. In a wireless power transmission system of a resonance type, a plurality of target receivers 1000 may receive power from the transmitter 100.

The matching unit 1450 included in the transmission unit 140 of the transmitter 100 may adaptively perform the impedance matching between the receivers 1000. When a plurality of receivers 1000 are provided, the same system or mutually different systems may be established.

Figure 13:
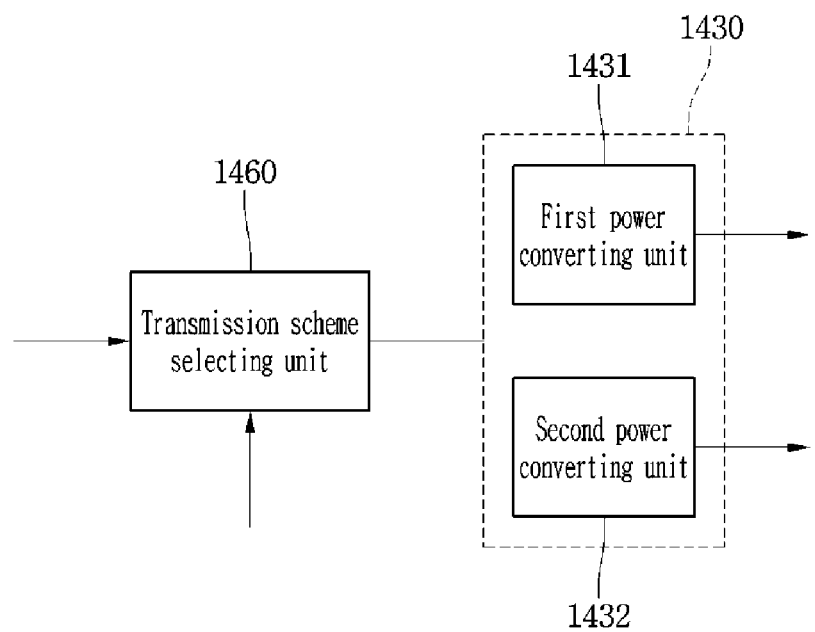
FIG. 13 is a block diagram showing a transmission type selecting unit and a power converting unit according to an embodiment.

The details and operations of the transmission selecting unit 1460 and the power converting unit 1430 included in the transmission unit 140 of the transmitter 100 in FIG. 11 will be described in detail with reference to FIG. 13.

The power converting unit 1430 may include first and second power converting units 1431 and 1432. The transmission scheme selecting unit 1460 may provide the DC power provided from the transformation unit 1420 to one of the first and second power converting units 1431 and 1432 according to the selection signal of the control unit 1440.

The first power converting unit 1431 may convert the DC power provided from the transformation unit 1420 into an AC power having a frequency of kHz~MHz to provide the AC power to the induction coil. The second power converting unit 1432 may convert the DC power provided from the transformation unit 1420 into an AC power having a frequency of kHz ~15 MHz to provide the AC power to the resonant coil.

Although it has been described above that the power converting unit 1430 employs the first and second power converting units 1431 and 1432 to provide a first AC power having a first frequency and a first amplitude to the induction coil and a second AC power having a second frequency and a second amplitude to the resonant coil, respectively, the AC powers having mutually different frequencies and amplitudes may be generated by using a single power converting unit 1430 according to the control of the control unit 4120 and may be provided to the induction and resonant coils, respectively.

Figure 14:
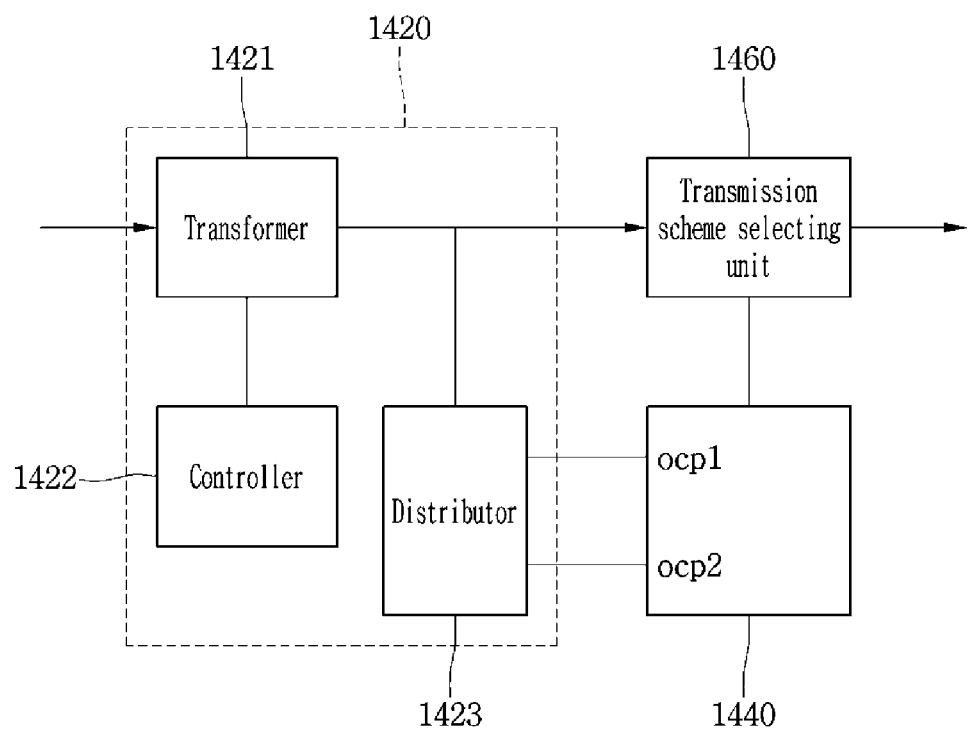
FIG. 14 is a block diagram showing a transformation unit and a control unit according to an embodiment.

FIG. 14 is a block diagram showing a transformation unit and a control unit according to an embodiment. The transformation unit 1420 may include a transformer 1421, a controller 1422 and a distributor 1423. Although it is depicted in the drawing that the distributor 1423 is included in the transformation unit 1420, the embodiment is not limited thereto and the distributor 1423 may be separated from the transformation unit 1420.

The control unit 1422, which is capable of regulating the output voltage of the transformation unit 1421, may receive a divided voltage of the output voltage of the transformer 1421, which is fed back thereto, to control an error of the output voltage. The distributor 1423 voltage-divides the output voltage of the transformer 1421 to provide the divided voltage to the controller 1422.

The controller 1422 may provide a square wave pulse, of which a pulse width is adjusted based on the distributed voltage by the distributor 1423 (Pulse width modulation: PWM), to the transformer 1421, and the transformer 1421 may output the DC voltage of which a level is adjusted according to the pulse width of the square wave pulse.

The distributor 1423 may be connected to first and second output control ports OCP1 and OCP2 of the control unit 1440. The control unit 1440 may output the control signal to the first or second output control port OCP1 or OCP2 according to the power transmission scheme to adjust a value of an input terminal voltage of the controller 1422, so that the output voltage of the transformer 1421 may be controlled.

Figure 15:
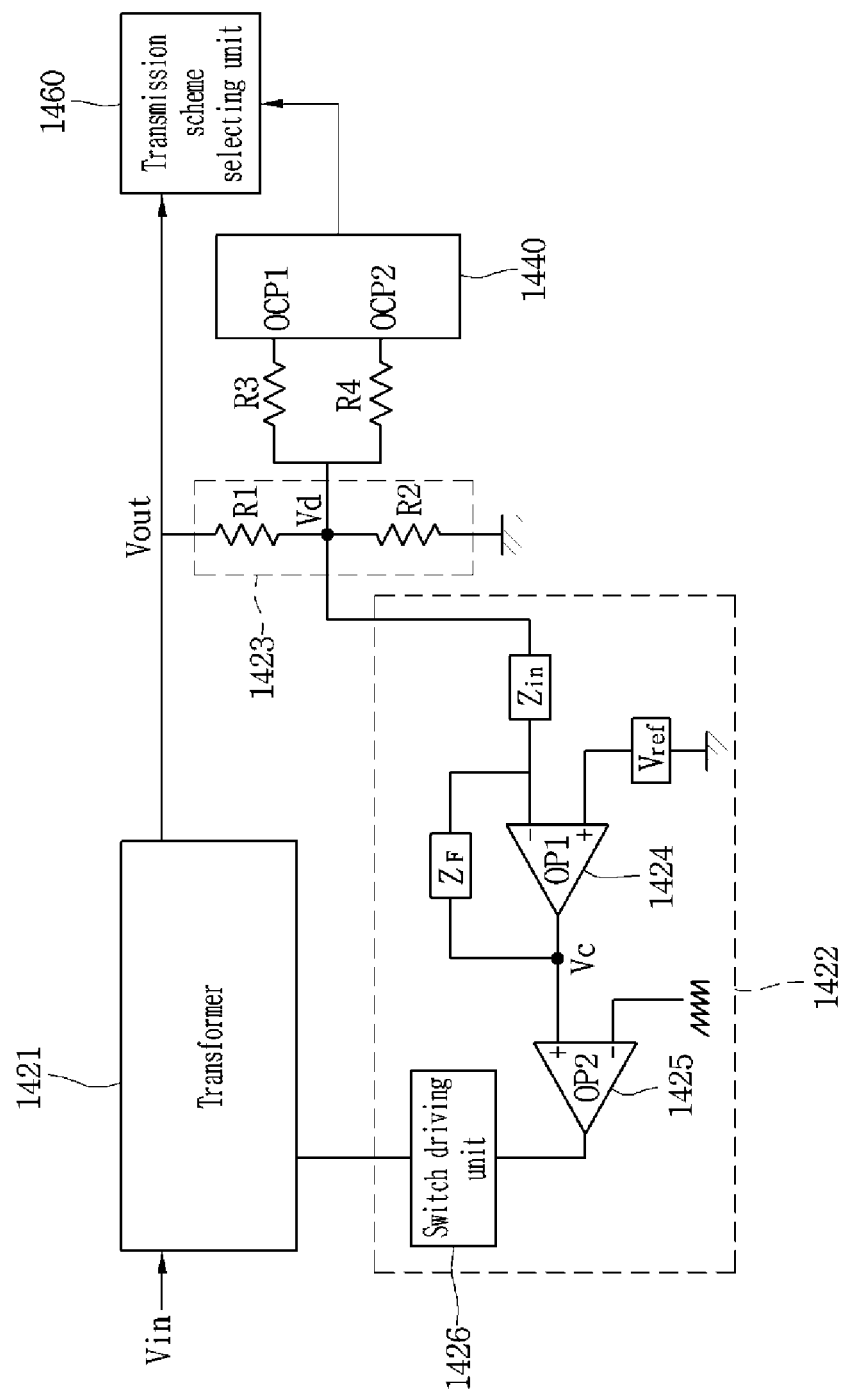
FIG. 15 is a block diagram showing a sub-system of a controller according to an embodiment.

FIG. 15 is a block diagram showing a controller according to an embodiment. A sub-system of the control unit 1422 may include an error amplifier 1424, a comparator 1425 and a switch driving unit 1426.

The error amplifier 1424 amplifies an error of the output voltage Vout of the transformer 1421 based on the distributed voltage Vd of the distributor 1423 and outputs the amplified voltage Vc. The error amplifier 1424 may include a first operational amplifier OP1. The output voltage of the transformer 1421 is applied to the inverting terminal of the first operational amplifier through the distributor 1423 and a reference voltage Vref is applied to the non-inverting terminal of the first operational amplifier. The error amplifier 1424 compares the output voltage of the transformer 1421 through the distributor 1423 with the reference voltage Vref and amplifies an error as the comparison result to input the amplified error to the comparator 1425.

The comparator 1425 generates the square wave pulse based on the output voltage Vc of the error amplifier 1424. The comparator 1425 may employ a second operational amplifier OP2. The output voltage Vc of the error amplifier 1424 is applied to the non-inverting terminal of the second operational amplifier OP2 and a triangular wave is applied to the inverting terminal of the second operational amplifier OP2. The comparator 1425 may compare the output voltage Vc of the error amplifier 1424 with the triangular wave to generate the square wave pulse for driving the transformer 1421 and may adjust the pulse width corresponding to the output error of the transformer 1421 to regulate the output voltage Vout of the transformer 1421.

The switch driving unit 1426 may drive the transformer 1421 based on the output of the comparator 1425. The switch included in the transformer 1421 is controlled to be turned on or off such that the voltage present to the transformer 1421 may be consistently maintained.

The control unit 1422 and the transformer 1421 may be integrated into the transformation unit (Integrated Chip: IC) 1420. As described above, the transformation unit 1420 may reflect the error of the preset voltage to output a constant voltage. However, a scheme which allows the control unit 1440 to control the transformation unit 1420 when there is a need to vary the output voltage of the transformation unit 1420 will be described.

The distributor 1423 may include a first resistor R1 connected to the output terminal of the transformer 1421 and the input terminal (inverting terminal) of the error amplifier 1424 and a second resistor R2 connected between the input terminal (inverting terminal) of the error amplifier 1424 and the ground. The relationship between the first and second resistors R1 and R2 is R1<R2.

The divided voltage Vd of the transformer 1421 may be varied with the values of the first and second resistors R1 and R2. Examining the principle, since the divided voltage Vd, which is obtained by dividing the output voltage Vout of the transformer 1421 through the first and second resistors R1 and R2, is compared with the reference voltage Vref and the difference between the divided voltage Vd and the reference voltage Vref is amplified, when the divided voltage Vd is less than the reference voltage Vref, the output level Vc of the error amplifier 1424 is increased at the ratio of a feedback resistance Rf to an input resistance Rin of the error amplifier 1421, that is, the gradient of −Rf/Rin. To the contrary, when the divided voltage Vd is greater than the reference voltage Vref, the output level Vc of the error amplifier 1424 is decreased at the gradient of −Rf/Rin.

Thus, although the divide voltage Vd may be fixed according to the first and second resistors R1 and R2, the output voltage of the transformer 1421 may be finally adjusted by controlling the divided voltage Vd.

The above-described functions may be performed by the control unit 1440. As the control unit 1440 is required to adjust the output voltage Vout of the transformer 1421 according to a power transmission environment. Since third or fourth resistor R3 or R4 is connected between one of the first and second output control ports OCP1 and OCP2 of the control unit 1440 and the input terminal (inverting terminal) of the error amplifier 1424, the voltage output from one of the first and second output control ports OCP1 and OCP2 of the control unit 1440 is adjusted so that the divided voltage Vd applied to the input terminal of the error amplifier 124 may be adjusted.

As described above, according to the method of adjusting the divided voltage Vd, the voltage output to the first and second output control ports OCP1 and OCP2 may be adjusted to control the divided voltage Vd. Differently from the above, the divided voltage Vd may be controlled through a scheme of allowing the control unit 1440 to adjust resistance values of variable resistors serving as the third and fourth resistors R3 and R4.

Meanwhile, the divided voltage Vd may be varied according to the control of the control unit 1440, so that it may be controlled whether a level of the output Vc of the error amplifier 1424 is increased or decreased based on the comparison between the divided voltage Vd and the reference voltage Vref.

When the output Vc of the error amplifier 1424 is compared with the triangular wave by the comparator 1425 so that the level of the output Vc of the error amplifier 1424 is increased, the comparator 1425 generates a square wave of which the pulse width is enlarged. When the level of the output Vc of the error amplifier 1424 is decreased, the comparator 1425 generates the pulse width of which the pulse width is narrowed. The relationship between the first to third resistors R1, R2 and R3 may be R1<R3<R2 and R1<R4<R2.

Hereinafter, the operational relationship between the transmission scheme selecting unit 1460, the control unit 1440 and the transformation unit 1420 will be described.

When the wireless power transmission system 1 transmits power in a magnetic induction scheme, the control unit 1440 transmits the control signal to the first output control port OCP1 so that the divided voltage value may be adjusted and the transformation unit 1420 may output the DC voltage corresponding to the adjusted divided voltage value. At the same time, the control unit 1440 may control the transmission scheme selecting unit 1460 to provide the DC voltage output from the transformer unit 1420 to the first power converting unit 1431, such that the power provided from the transformation unit 1420 is transferred to the induction coil.

When the wireless power transmission system 1 transmits power in a magnetic resonance scheme, the control unit 1440 transmits the control signal to the second output control port OCP2 so that the divided voltage value may be adjusted and the transformation unit 1420 may output the DC voltage corresponding to the adjusted divided voltage value. At the same time, the control unit 1440 may control the transmission scheme selecting unit 1460 to apply the power provided from the transformer unit 1420 to the second power converting unit 1432, such that the power provided from the transformation unit 1432 is transferred to the resonant coil.

Thus, the transmission scheme selecting unit 1460 may distinguish the cases requiring an inducing-type output and a resonant-type output from each other based on the selection control signal of the control unit 1440, such that the output provided from the transformation unit 1420 is provided to the corresponding coil.

The transmission scheme selecting unit 1460 may employ an analog switch, an MOSFET or a transistor to perform a switching operation.

That is, the transmission scheme selecting unit 1460 may selectively perform the operation of electrically connecting the transformation unit 1420 to the induction coil or the resonant coil based on the selection control signal from the control unit 1440.

Hereinafter, a scheme of controlling the output voltage of the transformation unit 1420 through the output control port by the control unit 1440 constituting the transmission unit 140 of the transmitter 100 based on information about communication between the transmitter 100 and the receiver 1000 will be described.

First, a control scheme of the transmitting side control unit 1440 will be described based on the communication type and communication information of the transmitting side communication unit 1441 and the receiving side communication unit 1151.

Figure 16:
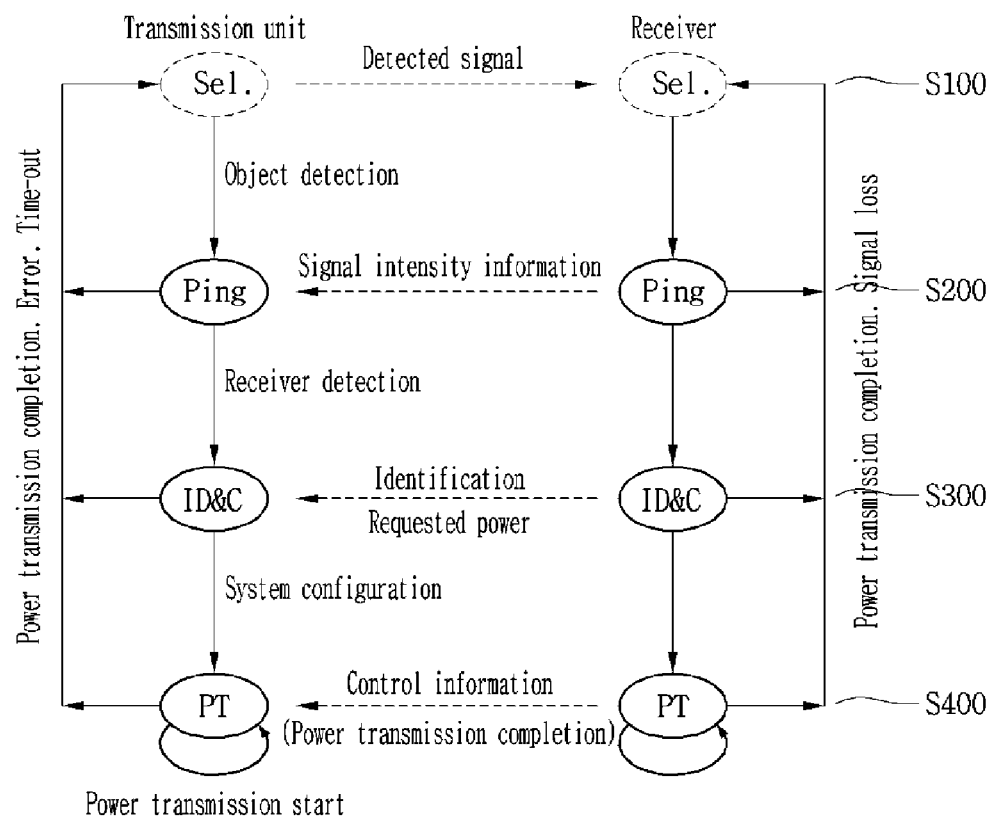
FIG. 16 is a flowchart illustrating a process from a step of detecting a receiver to a step of transmitting power from a transmitter to the receiver.

FIG. 16 is a flowchart illustrating a process from a step of detecting a receiver to a step of transmitting power from a transmitter to the receiver.

The control scheme may be substantially divided into four steps which include a step S100 of detecting the receiver 1000 (Selection), a step S200 of confirming a response (Ping), an identification and configuration step S300, and a power transfer step S400.

The step S100 of detecting the receiver 1000 generates a signal for allowing the transmitter 100 to detect existence of the receiver 1000 and waits for a response of the receiver 1000.

In the response confirming step S200, the receiver 1000 may transmit information about an intensity of the signal in order to allow the transmitter 100 to confirm the existence of the receiver 1000 based on the information.

In the identification and configuration step S300, the receiver 1000 transmits information about identification and requested power, and the transmitter 100 configures and prepares power transmission.

In the power transmission step S400, the receiver 1000 transmits the control information, and the transmitter 100 starts to transmit power.

When the signal is cut off or deteriorated while performing the four steps, the process may be on time-out so that the process returns to the first step. When an error is detected while transmitting power, the receiver 1000 is out of the charging area, or the charging is completed, the power transmission is terminated and the process returns to the first step.

Figure 17:
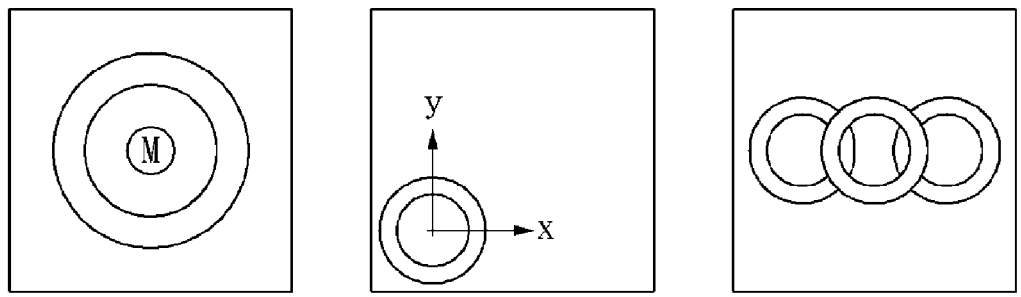
FIG. 17 is a sectional view showing a coil disposal relation in a transmitter antenna system.
Figure 18:
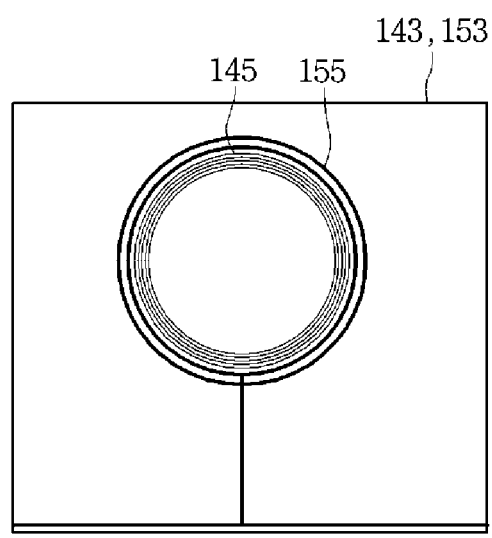
FIG. 18 is a view showing a coil unit including a resonant coil and an induction coil, or only an induction coil of a transmitter antenna.

FIG. 17 is a view showing a disposal relationship of an antenna coil of a transmitter. FIG. 18 is a view showing a coil unit including a resonant coil and an induction coil, or only an induction coil of the transmitter antenna.

As described above with reference to FIGS. 2 to 10, the coil unit may be the first and second transmission coils 145 and 155 included in the wireless transmission unit. In addition, the support member supporting the first and second transmission coils 145 and 155 may be the shield members 143 and 153 for shielding electromagnetic waves. The shield member may be formed of ferrite.

The first and second transmission coils 145 and 155 may be the induction coil and the resonant coil, respectively.

The wireless power transmission system may be mounted on a wireless charging system for a vehicle or an EV (Electric Vehicle) such as a PHEV (Plug-in Hybrid Electric Vehicle) as well as a portable phone or a smart phone. In addition, the wireless power transmission system may be mounted on an application for an industrial machine or a home appliance.

The application for an industrial machine includes an electrically-drive tool, a wireless sensor, or a slip ring (rotor) of an industrial motor. The home appliance includes a TV, a digital camera, a game console, an electric toothbrush, or a rechargeable battery. In addition, the wireless power transmission system may be applicable to a contactless IC card or a passive RFID.

The embodiment provides a wireless power transmission system having a wireless power transmitter, which is capable of varying the amplitude of an output voltage of a DC-DC transformer according to a power transmission scheme and efficiency while reducing an error of the output voltage of the DC-DC transformer.

In addition, the embodiment provides a wireless power transmission system having a wireless power transmitter, which is capable of actively controlling the output of a DC-DC transformer without regard to characteristics of the DC-DC transformer by variably controlling an output control port of a control unit.

In addition, the embodiment provides a wireless power transmission system having a wireless power transmitter, which includes a selection unit capable of suitably selecting one of the magnetic induction scheme and the magnetic resonance scheme by using one transformer and a control unit for controlling the selection unit.

In addition, the embodiment provides a wireless power transmitter having improved performance.

In addition, the embodiment provides a wireless power transmitter having a function of blocking an electromagnetic wave.

In addition, the embodiment provides a wireless power transmitter having a function of radiating heat.

According to the embodiment, there is provided a wireless power transmitter which includes a substrate; a first blocking unit disposed over the substrate and formed of a metallic material; a second blocking unit over the first blocking unit; and a wireless transmission unit mounted on at least one of the first blocking unit and the second blocking unit, wherein the wireless transmission unit includes: a first wireless transmission unit including a first transmission coil; a second wireless transmission unit including a second transmission coil; and a control unit to control such that AC power is output to a transmission coil of one of the wireless transmission units according to a power transmission scheme.

According to the embodiment, the wireless power transmission system may vary the amplitude of an output voltage of a DC-DC transformer according to a power transmission scheme and efficiency while reducing an error of the output voltage of the DC-DC transformer.

In addition, according to the embodiment, the wireless power transmission system may actively control the output of the DC-DC transformer without regard to characteristics of the DC-DC transformer by variably controlling the output control port of the control unit.

In addition, according to the embodiment, the wireless power transmission system may select one of the magnetic induction scheme and the magnetic resonance scheme or one of the plurality of coils and supply suitable power by using one transformer.

In addition, according to the wireless power transmitter of the embodiment, the blocking unit is interposed between the components and the wireless transmission unit to isolate the components and the wireless transmission unit from each other. That is, the blocking unit blocks the heat and the electromagnetic wave generated from the wireless transmission unit corresponding to the components. Further, the blocking unit blocks the heat and the electromagnetic wave generated from the components corresponding to the wireless transmission unit.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A wireless power transmitter comprising:
    a substrate;
    a first blocking unit disposed over the substrate and formed of a metallic material;
    a wireless transmission unit provided on the first blocking unit,
    wherein the wireless transmission unit includes a first transmission coil, a second transmission coil and a control unit controlling an AC power output to at least one of the first transmission coil or the second transmission coil according to a power transmission scheme,
    wherein the first and second transmission coil transmit power in mutually different schemes.

2. The wireless power transmitter of claim 1, further comprising a second blocking unit over the first blocking unit,
    wherein the first transmission coil is mounted on a top surface of the first blocking unit, and
    the second transmission coil is mounted on a top surface of the second blocking unit.

3. The wireless power transmitter of claim 1, wherein the first transmission coil includes an induction coil to perform an electromagnetic induction scheme, and the second transmission coil is a resonant coil to perform a resonance scheme.

4. The wireless power transmitter of claim 1, further comprising:

a transformation unit to convert power applied from a power supply unit into DC power;

a power converting unit to convert the DC power into AC power and to output the AC power to the wireless transmission unit, wherein the power converting unit includes a first power converting unit and a second power converting unit, and wherein the first power converting unit converts the DC power provided from the transformation unit into an AC power having a frequency to provide the AC power to the first transmission coil, and the second power converting unit converts the DC power provided from the transformation unit into an AC power having a frequency to provide the AC power to the second transmission coil.

5. The wireless power transmitter of claim 4, further comprising a selection unit to allow the AC power to be output to at least one of the transmission coil or the second transmission coil of the wireless power transmission unit based on a selection control signal of the control unit.

6. The wireless power transmitter of claim 5, wherein the power converting unit includes a first power converting unit and a second power converting unit and the selection unit provides the DC power to the first power converting unit or the second power converting unit.

7. The wireless power transmitter of claim 4, wherein the transformation unit includes a DC-DC converter and a controller to adjust an output voltage of the DC-DC converter by receiving the output voltage of the DC-DC converter.

8. The wireless power transmitter of claim 7, wherein the controller includes a distributor to divide the output voltage of the DC-DC converter to output a divided voltage.

9. The wireless power transmitter of claim 8, wherein the controller controls the divided voltage according to a selection of at least one of the first transmission coil or the second transmission coil.

10. The wireless power transmitter of claim 8, wherein the controller includes:

an error amplifier to compare the divided voltage with a reference voltage to amplify an error; and a comparator to output a pulse corresponding to an output of the error amplifier.

11. The wireless power transmitter of claim 8, wherein the controller adjusts the divided voltage based on information about communication between the wireless power transmitter and a wireless power receiver.

12. The wireless power transmitter of claim 1, wherein the wireless transmission unit is connected to the substrate by passing through an opening part formed in the first blocking unit.

13. The wireless power transmitter of claim 1, wherein the first blocking unit is coupled to an edge region of the second blocking unit to support the second blocking unit.

14. The wireless power transmitter of claim 1, wherein the second blocking unit is formed of a metallic material equal to or different from a metallic material of the first blocking unit.

15. The wireless power transmitter of claim 1, further comprising a low blocking unit disposed under the substrate.

16. The wireless power transmitter of claim 15, wherein the low blocking unit is coupled to an edge region of the first blocking unit to support the first blocking unit.

17. The wireless power transmitter of claim 15, further comprising a heat radiation unit mounted on the low blocking unit.

18. The wireless power transmitter of claim 17, wherein the heat radiation unit includes a plurality of heat radiation pins extending from the low blocking unit.

19. The wireless power transmitter of claim 1, wherein the metallic material includes aluminum and magnesium.

* * * * *